United States Patent
Jiang (10) Patent No.: US 10,694,572 B2
(45) Date of Patent: Jun. 23, 2020

(54) METHODS AND DEVICES FOR CONTROLLING STATES OF USER EQUIPMENT

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 10 days.

(21) Appl. No.: 15/869,446

(22) Filed: Jan. 12, 2018

(65) Prior Publication Data

US 2018/0206287 A1 Jul. 19, 2018

(30) Foreign Application Priority Data

Jan. 13, 2017 (CN) .......................... 2017 1 0025551

(51) Int. Cl.
*H04W 76/27* (2018.01)
*G01S 5/02* (2010.01)
(Continued)

(52) U.S. Cl.
CPC .............. *H04W 76/27* (2018.02); *G01S 5/02* (2013.01); *H04B 7/0417* (2013.01); *H04B 17/27* (2015.01);
(Continued)

(58) Field of Classification Search
CPC . H04W 76/27; H04W 36/24; H04W 36/0027; H04W 24/02; H04W 36/0072;
(Continued)

(56) References Cited

U.S. PATENT DOCUMENTS

2018/0124636 A1* 5/2018 Ly .......................... H04L 5/0044

FOREIGN PATENT DOCUMENTS

| CN | 101296451 A | 10/2008 |
| CN | 105898894 A | 8/2016 |

(Continued)

OTHER PUBLICATIONS

First Office Action (including English translation) issued in corresponding Chinese Application No. 201710025551.7, dated Jul. 31, 2018, 23 pages.

(Continued)

*Primary Examiner* — Fred A Casca
(74) *Attorney, Agent, or Firm* — Arch & Lake LLP (57) ABSTRACT

A method for state control of a user equipment includes: when in an inactive state, sending, a state indication message for indicating that the UE needs to switch to a connection state, to a base station, upon detecting that a preset state switching event is triggered; switching to the connection state according to a state switching instruction returned by the base station. The preset state switching event includes at least one of: a bearer corresponding to traffic data to be sent or received by the UE does not belong to a designated bearer that is a bearer capable of transmitting the service data in the inactive state; a message to be sent by the UE is a NAS message; a data buffer size of the UE exceeds a first threshold; and an RSRP value of a reference signal sent by the base station is less than a second threshold.

6 Claims, 6 Drawing Sheets

(51) Int. Cl.
*H04B 17/318* (2015.01)
*H04B 17/27* (2015.01)
*H04B 7/0417* (2017.01)
*H04L 5/00* (2006.01)
*H04W 64/00* (2009.01)
*H04W 24/02* (2009.01)
*H04W 36/00* (2009.01)
*H04W 36/24* (2009.01)
*H04W 68/00* (2009.01)
*H04L 1/06* (2006.01)
*G06N 20/00* (2019.01)
*H04W 88/06* (2009.01)

(52) U.S. Cl.
CPC ......... *H04B 17/318* (2015.01); *H04L 5/0007* (2013.01); *H04W 24/02* (2013.01); *H04W 36/0027* (2013.01); *H04W 36/0072* (2013.01); *H04W 36/24* (2013.01); *H04W 64/00* (2013.01); *H04W 64/003* (2013.01); *G06N 20/00* (2019.01); *H04L 1/06* (2013.01); *H04L 1/0612* (2013.01); *H04L 1/0662* (2013.01); *H04L 1/0668* (2013.01); *H04W 68/00* (2013.01); *H04W 88/06* (2013.01); *Y02D 70/10* (2018.01); *Y02D 70/12* (2018.01); *Y02D 70/1264* (2018.01); *Y02D 70/142* (2018.01); *Y02D 70/164* (2018.01); *Y02D 70/444* (2018.01)

(58) Field of Classification Search
CPC .. H04B 7/0413; H04B 7/0417; H04B 7/0452; H04B 17/318; G01S 5/02; Y02D 70/10; Y02D 70/1264
See application file for complete search history.

(56) References Cited

FOREIGN PATENT DOCUMENTS

| | | |
|---|---|---|
| CN | 106658758 A | 5/2017 |
| CN | 106714214 A | 5/2017 |

OTHER PUBLICATIONS

"Overall procedure for data transfer in inactive state," Samsung, R2-168051, 3GPP TSG-RAN WG2 Meeting #6, Reno, USA, Nov. 14-18, 2016, 6 pages.
"UE states in NR," CMCC, R2-167070, 3GPP TSG-RAN WG2 Meeting #95bis, Kaohsiung, Oct. 10-14, 2016, 6 pages.
"State Transition between Connected and Inactive," ITRI, Tdoc R2-168067, 3GPP TSG-RAN WG2 Meeting#96, Reno, USA, Nov. 14-18, 2016, 5 pages.
International Search Report issued in corresponding International Application No. PCT/CN2017/100726, dated Nov. 30, 2017, 4 pages.
International Search Report (including English translation) issued in corresponding International Application No. PCT/CN2017/100726, dated Nov. 30, 2017, 4 pages.
Catt, "DL data transmission in response to UL activity in RRC_INACTIVE," R2-1700207, 3GPP TSG-RAN WG2 Meeting NR, Spokane, WA, Jan. 17-19, 2017, 5 pages.
Huawei, Hisilicon, "DL data transmission in RRC_INACTIVE," R2-1700189, 3GPP TSG-RAN WG2 NR AdHoc, Spokane, WA, Jan. 17-19, 2017, 5 pages.
Interdigital Communications, "Uplink Data Transmissions in Inactive State," R2-1700469, 3GPP TSG-RAN WG2 NR Ad Hoc, Spokane, WA, Jan. 17-19, 2017, 4 pages.
ITRI, "Discussion on RRC State Transition between Connected and Inactive," Tdoc R2-1706930, 3GPP TSG-RAN WG2 NR Ad Hoc, Qingdao, China, Jun. 27-29, 2017, 4 pages.
Ericsson, "RRC state machine and RRC_INACTIVE characteristics," Tdoc R2-1700535, 3GPP TSG-RAN WG2 adhoc, Spokane, WA, Jan. 17-19, 2017, 11 pages.
Samsung, "Data transfer in inactive state based on 4-step RACH procedures," R2-1700366, 3GPP TSG-RAN WG2 2017 Jan NR Ad-hoc Meeting, Spokane, WA, Jan. 17-19, 2017, 7 pages.
Search Report in corresponding European Patent Application No. 18151688.1, dated May 29, 2018 15 pages.

* cited by examiner

METHODS AND DEVICES FOR CONTROLLING STATES OF USER EQUIPMENT

CROSS-REFERENCE TO RELATED APPLICATION

This application is based upon and claims priority to Chinese Patent Application No. 201710025551.7, filed on Jan. 13, 2017, the entire contents of which are incorporated herein by reference.

TECHNICAL FIELD

The present disclosure relates to the field of communication technologies, and more particularly to methods and devices for state control of a user equipment, a user equipment and a base station.

BACKGROUND

In a long term evolution (LTE) system, two states are defined for a user equipment (UE): an idle state and a connection state. When the UE needs to transmit traffic data, it needs to establish a Radio Resource Control (RRC) connection with a base station, thereby switching from the idle state to the connection state.

In the LET system, the UE can transmit the traffic data only in the connection state, and switching from the idle state to the connection state will generally cause larger signaling overhead. In order to achieve the transmission of the traffic data while reducing the signaling overhead, a third state (i.e., an inactive state) of the UE is introduced in the fifth generation mobile communication technology (5G). In the inactive state, the UE can perform the transmission of the traffic data having smaller packets without entering the connection state.

SUMMARY

The present disclosure provides a method and a device for state control of a user equipment, a user equipment, and a base station. The technical solutions are provided as follows.

According to a first aspect of the present invention, there is provided a method for state control of a user equipment, applied to a user equipment, including: detecting whether a preset state switching event is triggered, when in an inactive state; sending, a state indication message for indicating that the UE needs to switch to a connection state, to a base station, upon detecting that the preset state switching event is triggered, wherein a state switching instruction for instructing the UE to switch to the connection state is returned by the base station according to the state indication message; switching from the inactive state to the connection state according to the state switching instruction. The preset state switching event includes at least one of the followings: a bearer corresponding to traffic data to be sent by the UE does not belong to a designated bearer that is a bearer capable of transmitting traffic data in the inactive state; a message to be sent by the UE is a non-access stratum (NAS) message; a data buffer size of the UE exceeds a first threshold; a reference signal receiving power (RSRP) value of a reference signal sent by the base station is less than a second threshold; a bearer corresponding to traffic data to be received by the UE does not belong to the designated bearer.

According to a second aspect of the present invention, there is provided a method for state control of a user equipment, applied to a base station, the method including: receiving a state indication message that is sent by the user equipment (UE) upon detecting that a preset state switching event is triggered; and generating a state switching instruction for instructing the UE to switch to a connection state according to the state indication message; and sending the state switching instruction to the UE.

According to a third aspect of the present invention, there is provided a device for state control of a user equipment. The device may include: a detector configured to detect whether a preset state switching event is triggered, when in an inactive state; a transmitter configured to send, a state indication message for indicating that the UE needs to switch to a connection state, to a base station, upon detecting that the preset state switching event is triggered, wherein a state switching instruction for instructing the UE to switch to the connection state is returned by the base station according to the state indication message; and a state switching circuit configured to switch from the inactive state to the connection state according to the state switching instruction. The preset state switching event includes at least one of the followings: a bearer corresponding to traffic data to be sent by the UE does not belong to a designated bearer that is a bearer capable of transmitting the service data in the inactive state; a message to be sent by the UE is a non-access stratum (NAS) message; a data buffer size of the UE exceeds a first threshold; an RSRP value of a reference signal sent by the base station is less than a second threshold; and a bearer corresponding to traffic data to be received by the UE does not belong to the designated bearer.

According to a fourth aspect of the present invention, there is provided a device for state control of a user equipment. The device may include: a receiver configured to receive a state indication message that is sent by a user equipment (UE) upon detecting that the preset state switching event is triggered; a generating circuit configured to generate a state switching instruction for instructing the UE to switch to a connection state based on the state indication message; and a transmitter configured to send the state switching instruction to the UE.

According to a fifth aspect of the present invention, there is provided a user equipment, including: a processor; a memory configured to store processor executable instructions. The processor is configured to: detect whether a preset state switching event is triggered when in an inactive state; send, a state indication message for indicating that the UE needs to switch to a connection state, to a base station, upon detecting that the preset state switching event is triggered, wherein a state switching instruction for instructing the UE to switch to the connection state is returned by the base station according to the state indication message; and switch from the inactive state to the connection state according to the state switching instruction. The preset state switching event includes at least one of the followings: a bearer corresponding to traffic data to be sent by the UE does not belong to a designated bearer that is a bearer capable of transmitting traffic data in the inactive state; a message to be sent by the UE is a non-access stratum (NAS) message; a data buffer size of the UE exceeds a first threshold; an RSRP value of a reference signal sent by the base station is less than a second threshold; and a bearer corresponding to traffic data to be received by the UE does not belong to the designated bearer.

According to a sixth aspect of the present invention, there is provided a base station, including: a receiver, a transmitter, a memory and a processor, wherein the receiver, the transmitter, and the memory are respectively connected to the processor. The memory is configured to store processor executable instructions, and the processor is configured to: receive a state indication message that is sent by a UE upon detecting that a preset state switching event is triggered; and generate, a state switching instruction for instructing the UE to switch to a connection state, based on the state indication message; and send the state switching instruction to the UE.

According to a seventh aspect of the present disclosure, there is provided a non-transitory computer-readable storage medium storing instructions, executable by a processor in a user equipment, for performing a method for state control of a user equipment, the method including: detecting whether a preset state switching event is triggered, when in an inactive state; sending, a state indication message for indicating that the UE needs to switch to a connection state, to a base station, upon detecting that the preset state switching event is triggered, wherein a state switching instruction for instructing the UE to switch to the connection state is returned by the base station according to the state indication message; switching from the inactive state to the connection state according to the state switching instruction. The preset state switching event includes at least one of the followings: a bearer corresponding to traffic data to be sent by the UE does not belong to a designated bearer that is a bearer capable of transmitting traffic data in the inactive state; a message to be sent by the UE is a non-access stratum (NAS) message; a data buffer size of the UE exceeds a first threshold; an RSRP value of a reference signal sent by the base station is less than a second threshold; and a bearer corresponding to traffic data to be received by the UE does not belong to the designated bearer.

According to an eighth aspect of the present disclosure, there is provided a non-transitory computer-readable storage medium storing instructions, executable by a processor in a base station, for performing a method for state control of a user equipment, the method including: receiving a state indication message that is sent by the user equipment (UE) upon detecting that a preset state switching event is triggered; and generating a state switching instruction for instructing the UE to switch to a connection state according to the state indication message; and sending the state switching instruction to the UE.

It is to be understood that both the foregoing general description and the following detailed description are exemplary and explanatory only and do not limit the present disclosure.

BRIEF DESCRIPTION OF THE DRAWINGS

The accompanying drawings, which are incorporated into and constitute a part of this specification, illustrate embodiments consistent with the present disclosure, together with the description, serve to explain the principles of the present disclosure.

DETAILED DESCRIPTION

To make the objects, technical solutions and advantages of the present disclosure clearer, embodiments of the present disclosure will be further described in more detail in combination with the accompanying drawings.

Exemplary embodiments will be described in detail herein, examples of which are shown in the accompanying drawings. The following description refers to the accompanying drawings in which the same numerals in different drawings represent the same or similar elements unless otherwise represented. The implementations set forth in the following exemplary embodiments are not representative of all implementations consistent with the present disclosure. Rather, they are merely examples of devices and methods consistent with some aspects of the present disclosure as detailed in the appended claims.

Figure 1:
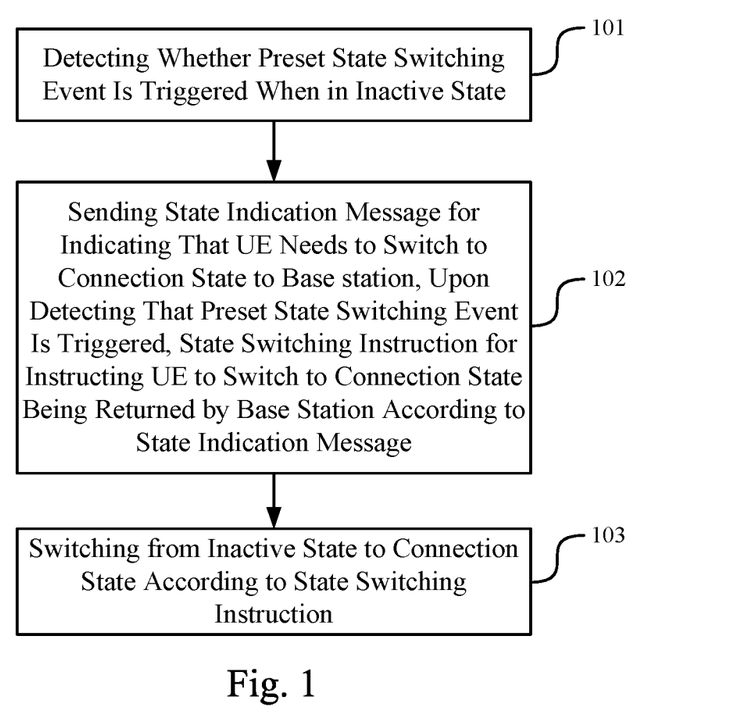
FIG. 1 is a flow chart illustrating a method for state control of a user equipment, in accordance with an aspect of the disclosure.

FIG. 1 is a flow chart illustrating a method for state control of a user equipment in accordance with an aspect of the disclosure. As shown in FIG. 1, the method applied to the user equipment includes the following steps.

In step 101, whether a preset state switching event is triggered is detected when in an inactive state.

In step 102, a state indication message for indicating that the UE needs to switch to a connection state is sent to a base station, upon detecting the preset state switching event is triggered, wherein a state switching instruction for instructing the UE to switch to the connection state is returned by the base station according to the state indication message. The user equipment may receive the state switching instruction from the base station when the user equipment is in the inactive state.

Here, the preset state switching event includes at least one of the followings:

a bearer corresponding to traffic data to be sent by the UE does not belong to a designated bearer that is a bearer capable of transmitting the traffic data in the inactive state;

a message to be sent by the UE is a non-access stratum (NAS) message;

a data buffer size of the UE exceeds a first threshold;

an RSRP value of a reference signal sent by the base station is less than a second threshold; and a bearer corresponding to traffic data to be received by the UE does not belong to the designated bearer.

In step 103, switching from the inactive state to the connection state is performed according to the state switching instruction.

In the method provided by the embodiments of the present disclosure, when in inactive state, the UE may switch from the inactive state to the connection state upon detecting the preset state switching event is triggered. Moreover, the preset state switching event can fully cover situations in which the UE needs to switch to the connection state for data reception, so that the UE can ascertain when it needs to switch to the connection state, thereby ensuring normal transmission of various types of traffic data.

In one possible implementation, the preset state switching event includes that the bearer corresponding to the traffic data to be received by the UE does not belong to the designated bearer, and the detecting whether the preset state switching event is triggered includes:

when a first paging message sent by the base station is received, determining that the preset state switching event is triggered, wherein the first paging message carries state switching information for indicating that the bearer corresponding to the traffic data to be received by the UE does not belong to the designated bearer; or when a second paging message sent by the base station is received, determining whether the bearer corresponding to the traffic data to be received belongs to the designated bearer, according to a traffic type of traffic data carried in the second paging message; if the bearer corresponding to the traffic data to be received does not belong to the designated bearer, determining that the preset state switching event is triggered.

In one possible implementation, the sending the state indication message to a base station includes: generating switching reason information according to the triggered preset state switching event; sending the switching reason information carried in the state indication message to the base station, wherein the state switching instruction is returned by the base station according to the switching reason information.

In one possible implementation, when the preset state switching event includes that the bearer corresponding to the traffic data to be sent by the UE does not belong to the designated bearer, or includes that the bearer corresponding to the traffic data to be received by the UE does not belong to a designated bearer, prior to detecting whether the preset state switching event is triggered, the method further includes:

receiving an inactive state instruction of the base station, wherein the inactive state instruction includes configuration information of the designated bearer for indicating a traffic type of the traffic data corresponding to the designated bearer; entering the inactive state according to the inactive state instruction, and storing the configuration information of the designated bearer; and performing the step of detecting whether the preset state switching event is triggered according to the configuration information of the designated bearer.

All of the alternative technical solutions described above may be formed in any combination to form alternative embodiments of the present disclosure which will not be described in detail herein.

Figure 2:
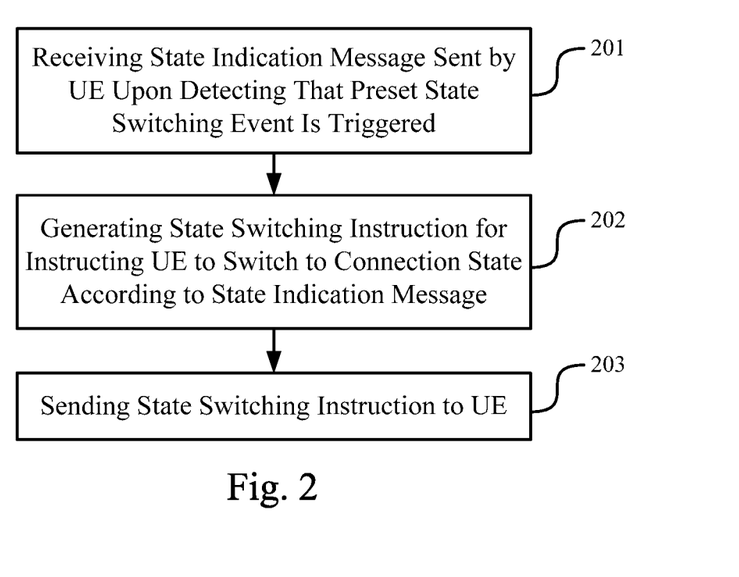
FIG. 2 is a flow chart illustrating a method for state control of a user equipment, in accordance with an aspect of the disclosure.

FIG. 2 is a flow chart illustrating a method for state control of a user equipment in accordance with an aspect of the disclosure. As shown in FIG. 2, the method applied to the base station includes the following steps.

In step 201, a state indication message is received, wherein the state indication message is sent by the user equipment (UE) upon detecting that the preset state switching event is triggered.

In step 202, a state switching instruction for instructing the UE to switch to a connection state is generated according to the state indication message.

In step 203, the state switching instruction is sent to the UE.

In the method provided by the embodiments of the present disclosure, when the UE is in an inactive state, the base station can generate a state switching instruction for instructing the UE to switch from the inactive state to the connection state, according to the state indication message sent by the UE upon detecting that the preset state switching event is triggered. Moreover, the preset state switching event can fully cover situations in which the UE needs to switch to the connection state for data reception, so that the UE can ascertain when it needs to switch to the connection state, thereby ensuring normal transmission of various types of traffic data.

In one possible implementation, the generating the state switching instruction according to the state indication message includes:

determining whether to allow the UE to switch to the connection state according to the switching reason information; and if the UE is allowed to switch to the connection state, generating the state switching instruction.

In one possible implementation, the method further includes:

If a bearer corresponding to traffic data to be sent by the base station does not belong to a designated bearer that is a bearer capable of transmitting traffic data in an inactive state, sending a first paging message to the UE, wherein the first paging message carries state switching information for indicating that the bearer corresponding to the traffic data does not belong to the designated bearer; or if the bearer corresponding to the traffic data to be sent by the base station does not belong to the designated bearer, sending, a second paging message carrying the traffic type of the traffic data, to the UE.

In one possible implementation, prior to receiving the state indication message, the method further includes:

obtaining configuration information of a designated bearer that is a bearer capable of transmitting traffic data in an inactive state, wherein the configuration information of the designated bearer is used to indicate a traffic type of the traffic data corresponding to the designated bearer; sending, an inactive state instruction carrying the configuration information of the designated bearer, to the UE.

All of the alternative technical solutions described above may be formed in any combination to form alternative embodiments of the present disclosure, which will not be described in detail herein.

Figure 3:
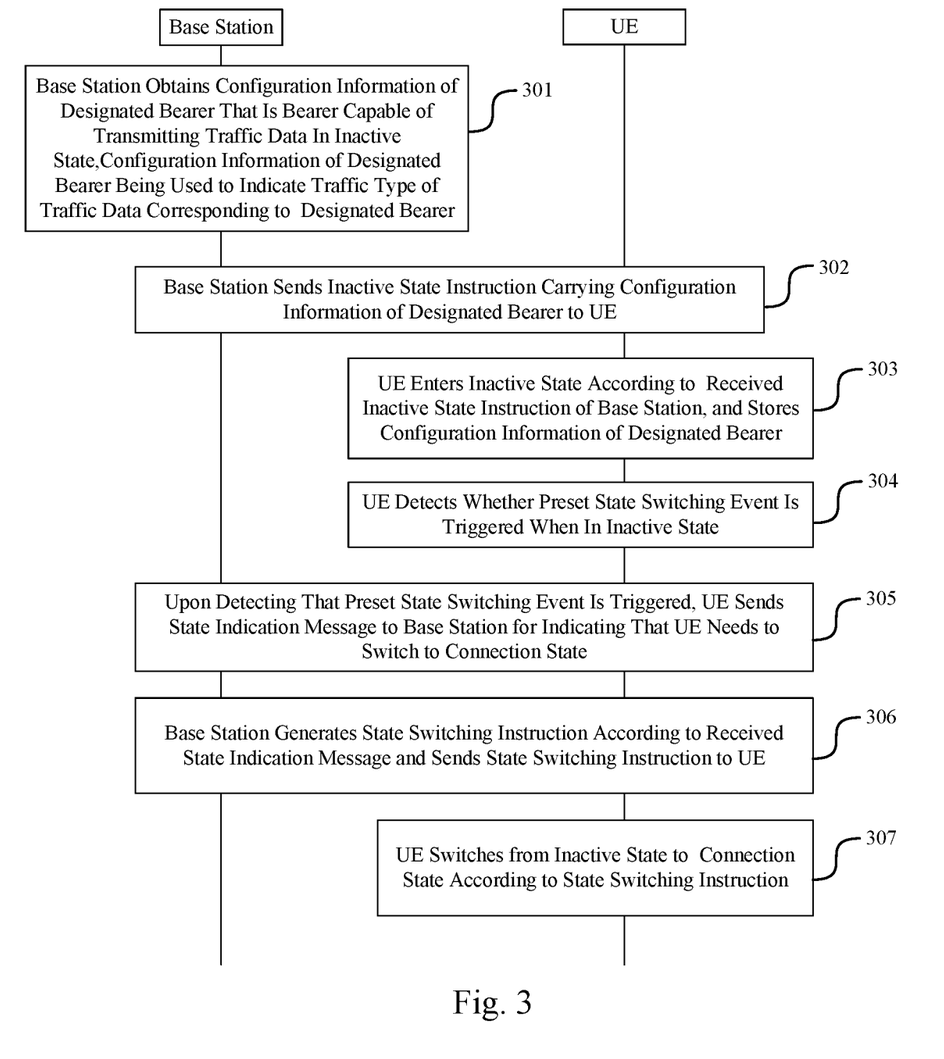
FIG. 3 is a flow chart illustrating a method for state control of a user equipment, in accordance with an aspect of the disclosure.

FIG. 3 is a flow chart illustrating a method for state control of a user equipment in accordance with an aspect of the disclosure. As shown in FIG. 3, interacting entities involved are a UE and a base station, and the method includes the following steps.

In step 301, the base station obtains configuration information of a designated bearer that is a bearer capable of transmitting traffic data in an inactive state, and the configuration information of the designated bearer is used to indicate a traffic type of the traffic data corresponding to the designated bearer.

A radio bearer (RB) is a general term for a series of protocol entities and configurations assigned by the base station to the UE, including packet data convergence protocol (PDCP) entities, radio link control (RLC) entities and a series of resources allocated at a media access control (MAC) layer and a physical layer (PHY). The radio bearer is a channel between the base station and the UE connected through a Uu interface. The protocol architecture includes, from bottom to top, a PHY protocol, an MAC protocol, an RLC protocol and a PDCP protocol. Data transmission needs to be conducted between the base station and the UE through an established bearer. The radio bearer includes a signaling radio bearer (SRB) and a data radio bearer (DRB), where the signaling radio bearer is used for transmitting signaling and the data radio bearer is used for transmitting traffic data. In this embodiment, the designated bearer belongs to the data radio bearer. It is to be noted that the radio bearer is referred to as a bearer in this embodiment.

When the UE is in an inactive state, interaction of traffic data belonging to a specific type may be conducted between the base station and the UE. The traffic data belonging to the specific type may include one or more of the following traffic characteristics: a time interval of sending traffic data is greater than a certain period of time threshold, a size of a traffic packet is smaller than a certain packet size, or the number of traffic packets in a certain period of time is less than a certain number of packets. For example, the specific traffic type may refer to traffic associated with Internet of Things. For example, a time interval for sending the traffic data may be greater than or equal to half an hour, or a size of a traffic packet is within a few hundred bytes, or the number of traffic packets within one hour is less than 10, etc. In this embodiment, only exemplary examples are given and the specific values of the corresponding traffic characteristics are not limited. In practice, the specific traffic type may also correspond to traffic other than the Internet of Things traffic, and may be configured or modified by the base station as needed. The base station transmits the traffic data belonging to the specific traffic type through the designated bearer.

Here, the designated bearer is a bearer capable of transmitting traffic data in the inactive state. The designated bearer may include one or more bearers. In this embodiment, the base station may use different bearers to transmit traffic data of different traffic types, and the base station may determine a designated bearer for transmitting traffic data in the inactive state of UE, according to a corresponding relationship between a traffic type and a bearer. The configuration information of the designated bearer includes at least a corresponding traffic type and a bearer identifier of the designated bearer. In addition, the configuration information of the designated bearer may also include uplink and downlink information respectively for indicating whether the corresponding designated bearer is used for uplink transmission or downlink transmission, so that the UE can directly know through which designated bearers traffic data can be transmitted, and through which designated bearers traffic data can be received.

In step 302, the base station sends an inactive state instruction to the UE, wherein the inactive state instruction carries the configuration information of the designated bearer.

In the embodiments of the present disclosure, if the UE completes one-time data interaction with the base station in the connection state, the base station may determines whether or not to allow the UE to enter the inactive state according to stored context information of the UE. The context information includes a traffic type of traffic supported by the UE and configuration information of a bearer assigned to each corresponding traffic type. When the base station determines that there is the specific traffic type described in step 301 in the traffic type of the traffic supported by the UE, it determines to allow the UE to enter the inactive state. At this point, the base station may send an inactive state instruction to the UE. In order to enable the UE to determine which traffic data can be transmitted in the inactive state and through which bearers the traffic data can be transmitted, the base station may perform step 301 to obtain the configuration information of the designated bearer when determining to allow the UE to enter the inactive state. Then the configuration information of the designated bearer is carried in the inactive state instruction when the inactive state instruction is sent to the UE.

Here, the inactive state instruction may include a connection release instruction or connection suspend instruction for an LTE system, or a new dedicated instruction or the like, and this embodiment is not limited thereto.

In step 303, the UE enters the inactive state according to the received inactive state instruction of the base station, and stores the configuration information of the designated bearer.

After receiving the inactive state instruction, the UE switches from the connection state to the inactive state. It is to be noted that, when the configuration information of the designated bearer is to be stored, when the UE detects that the configuration information of the designated bearer has already been stored, the configuration information of the designated bearer currently received will be ignored, and when it is detected that the configuration information of the designated bearer has not been stored, the step of storing the configuration information of the designated bearer will be performed.

Of course, in step 302, the base station may detect whether the configuration information of the designated bearer has been sent to the UE. If the configuration information has already been sent, the configuration information of the designated bearer may not be carried when the inactive state instruction is sent.

In step 304, it is detected whether a preset state switching event is triggered when the UE is in the inactive state.

In the embodiments of the present disclosure, the preset state switching event includes at least one of the followings:

(1) a bearer corresponding to traffic data to be sent by the UE does not belong to a designated bearer;

(2) a message to be sent by the UE is a NAS (non-access stratum) message;

(3) a data buffer size of the UE exceeds a first threshold;

(4) an RSRP value of a reference signal sent by the base station is less than a second threshold; and (5) a bearer corresponding to traffic data to be received by the UE does not belong to a designated bearer.

It is to be noted that in an actual application, when the preset state switching event includes the (1) and (5) of the five preset state switching events described above, the UE needs to perform the step of detecting whether or not the preset state switching event is triggered according to the configuration information of the designated bearer.

The detection process for each of the preset state switching events described above is explained below.

Regarding the preset state switching event (1): when the UE detects that traffic data needs to be transmitted, whether the bearer corresponding to the traffic data belongs to the designated bearer is determined according to a traffic type of the traffic data and the configuration information of the designated bearer, that is, whether the traffic type of the traffic data is the same as a traffic type indicated by the designated bearer is determined. When the bearer corresponding to the traffic data does not belong to the designated bearer, it is determined that the preset state switching event is triggered.

Regarding the preset state switching event (2): when the UE detects that a message needs to be transmitted, whether the message is an NAS message is determined, according to a message type of the message. If the message is a NAS message, it is determined that the preset state switching event is triggered.

Regarding the preset state switching event (3): the UE may periodically monitor a local data buffer size. When it is monitored that the local data buffer size exceeds the first threshold, it is determined that the preset state switching event is triggered.

Regarding the preset state switching event (4): the UE periodically obtains a reference signal sent by the base station and determines an RSRP (Reference Signal Receiving Power) value of the reference signal. If the RSRP value is less than the second threshold, it is determined that the preset state switching event is triggered.

Regarding the preset state switching event (5): there are two ways to detect whether the preset state switching event is triggered.

In the first way, it is determined that the preset state switching event is triggered, if the UE receives a first paging message, from the base station, carrying the state switching information.

Here, the switching information is used to indicate that the bearer corresponding to the traffic data to be received by the UE does not belong to the designated bearer.

The base station may notify the UE of the reception of the traffic data through the paging message before sending the traffic data to the UE. If the bearer corresponding to the traffic data to be sent by the base station does not belong to the designated bearer, that is, the traffic data to be sent needs to be received by the UE in the connection state, the base station may send the state switching message carried directly in the paging message to the UE when the UE is in the inactive state, so that the UE ascertain that the traffic data needs to be received in the connection state. In this embodiment, a paging message carrying the state switching information is referred to as a first paging message. If the state switching information is carried in the paging message received by the UE, it is determined that the connection state needs to be entered to receive the traffic data.

In the second way, when the UE receives a second paging message from the base station, whether the bearer corresponding to the traffic data to be received belongs to the designated bearer is determined according to a traffic type of the traffic data carried in the second paging message. When the bearer corresponding to the traffic data to be received does not belong to the designated bearer, it is determined that the preset state switching event is triggered.

In this way, the base station may obtain a traffic type of the traffic data to be transmitted, and when the bearer corresponding to the traffic data to be transmitted does not belong to the designated bearer, the traffic type is carried in the second paging message and sent to the UE. The UE determines whether the bearer corresponding to the traffic data to be received belongs to the designated bearer according to the received traffic type. For example, the UE may determine whether the traffic type carried in the second paging message is the traffic type indicated by the designated bearer according to the configuration information of the designated bearer, and when it is not the one indicated by the designated bearer, it is determined that the bearer corresponding to the traffic data to be received does not belong to the designated bearer, thereby determining that the preset state switching event is triggered.

In step 305, the UE sends a state indication message to the base station upon detecting that the preset state switching event is triggered, wherein the state indication message is used to indicate that the UE needs to switch to the connection state.

Here, the state indication message may include an RRC message, such as a connection recovery request message or a connection establishment request message in an RRC message, or the state indication message may include a new dedicated request message or the like, and this embodiment is not limited thereto.

In another embodiment, the state indication message may also carry switching reason information. For example, the UE may generate the switching reason information according to the triggered preset state switching event, and send the switching reason information carried in the state indication message to the base station. Here, the content of the switching reason information may include text or a value. For example, when the triggered preset state switching event is the event (1) in step 304, the switching reason information may include text such as "event 1" or "transmitted traffic data does not correspond to a designated bearer", or a value of 1. Of course, when the switching reason information is represented by a numerical value, the base station (or UE) may set the numerical value of the preset state switching event in advance and synchronize the set numerical value to the UE (or base station).

In step 306, the base station generates a state switching instruction based on the received state indication message and sends the state switching instruction to the UE.

By default, if the base station receives the state indication message of the UE, it returns the state switching instruction to the UE to instruct the UE to switch to the connection state.

In some embodiments, when the state indication message carries the switching reason information, the process in which the base station generates the state switching instruction according to the received state indication message may also include: determining, by the base station, whether to allow the UE to switch to the connection state according to the switching reason information, and generating the state switching instruction if it is determined that the UE is allowed to switch to the connection state. For example, the base station side may also be preconfigured with the preset state switching event, and the base station may match the switching reason information with the preset state switching event. If the matching is successful, it is determined that the UE is allowed to switch to the connection state. Here, as an example in which a numerical value is used to represent the switching reason information, when the numerical value of the switching reason information is included in the stored numerical value corresponding to the preset state switching event, it is determined that the matching is successful. Of course, when a numerical value is used to represent the switching reason information, the base station may be only configured with a numerical value set for the preset state switching event, and this embodiment is not limited thereto. It is to be noted that if the base station determines that the UE is not allowed to switch to the connection state, a rejection switching instruction is generated and sent to the UE.

It is to be noted that the state switching instruction may include a connection recovery message or a connection establishment message in an RRC message. Of course, the state switching instruction may also be a dedicated connection message for instructing the UE to enter the connection state, and this embodiment is not limited thereto.

In step 307, the UE switches from the inactive state to the connection state according to the state switching instruction.

After the UE switches from the inactive state to the connection state, a confirmation message may be returned to the base station to complete the state switching process. Here, the confirmation message may include a connection recovery confirmation message or a connection establishment confirmation message in an RRC message, or a confirmation message for a dedicated connection message, and this embodiment is not limited thereto.

In the method provided in the embodiments of the present disclosure, when the UE is in the inactive state, it can switch from the inactive state to the connection state upon detecting that the preset state switching event is triggered. Moreover, the preset state switching event can fully cover situations in which the UE needs to switch to the connection state for data reception, so that the UE can ascertain when it needs to switch to the connection state, thereby ensuring normal transmission of various types of traffic data.

Figure 4A:
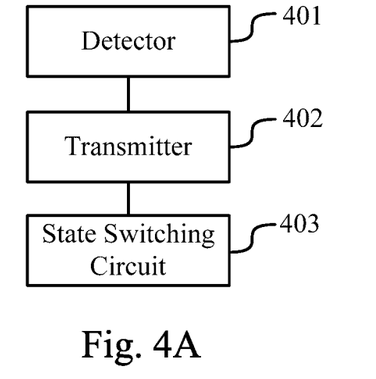
FIG. 4A is a block diagram of a device for state control of a user equipment, in accordance with an aspect of the disclosure.

FIG. 4A is a block diagram of a device for state control of a user equipment in accordance with an aspect of the disclosure. With reference to FIG. 4A, the device includes a detector 401, a transmitter 402 and a state switching circuit 403.

The detector 401, connected to the transmitter 402, is configured to detect whether a preset state switching event is triggered, when in an inactive state. The transmitter 402, connected to the state switching circuit 403, is configured to send, a state indication message for indicating that the UE needs to switch to a connection state, to a base station, when it is detected that the preset state switching event is triggered, wherein a state switching instruction for instructing the UE to switch to the connection state is returned by the base station according to the state indication message. The state switching circuit 403 is configured to switch from the inactive state to the connection state according to the state switching instruction.

Wherein, the preset state switching event includes at least one of the followings:

a bearer corresponding to traffic data to be sent by the UE does not belong to a designated bearer that is a bearer capable of transmitting traffic data in the inactive state;

a message to be sent by the UE is a non-access stratum (NAS) message;

a data buffer size of the UE exceeds a first threshold;

an RSRP value of a reference signal sent by the base station is less than a second threshold; and a bearer corresponding to traffic data to be received by the UE does not belong to the designated bearer.

In one possible implementation, when the preset state switching event includes that the bearer corresponding to the traffic data to be received by the UE does not belong to the designated bearer, the detector 401 is configured to:

when a first paging message sent by the base station is received, determine that the preset state switching event is triggered, wherein the first paging message carries state switching information for indicating that the bearer corresponding to the traffic data to be received by the UE does not belong to the designated bearer; or when a second paging message sent by the base station is received, determine whether the bearer corresponding to the received traffic data belongs to the designated bearer according to a traffic type of the traffic data carried in the second paging message; and determine that the preset state switching event is triggered if the bearer corresponding to the traffic data to be received does not belong to the designated bearer.

In one possible implementation, the transmitter 402 is configured to generate switching reason information according to the triggered preset state switching event; send the switching reason information carried in the state indication message to the base station, wherein the state switching instruction is returned by the base station based on the switching reason information.

Figure 4B:
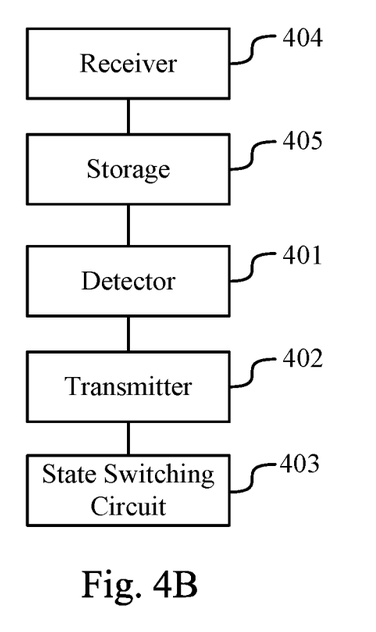
FIG. 4B is a block diagram of a device for state control of a user equipment, in accordance with an aspect of the disclosure.

In one possible implementation, when the preset state switching event includes the bearer corresponding to the traffic data to be sent by the UE does not belong to a designated bearer, or includes the bearer corresponding to the traffic data to be received by the UE does not belong to the designated bearer, with reference to FIG. 4B, the device further includes:

A receiver 404 configured to receive an inactive state instruction of the base station, wherein the inactive state instruction includes configuration information of the designated bearer for indicating a traffic type of the traffic data corresponding to the designated bearer;

A storage 405 configured to enter the inactive state according to the inactive state instruction, and storing the configuration information of the designated bearer.

The detector is configured to perform the step of detecting whether the preset state switching event is triggered, according to the configuration information of the designated bearer.

In the device provided by the embodiments of the present disclosure, when the UE is in inactive state, it can switch from the inactive state to the connection state upon detecting that the preset state switching event is triggered. Moreover, the preset state switching event can fully cover situations in which the UE needs to switch to the connection state for data reception, so that the UE can ascertain when it needs to switch to the connection state, thereby ensuring normal transmission of various types of traffic data.

Figure 5A:
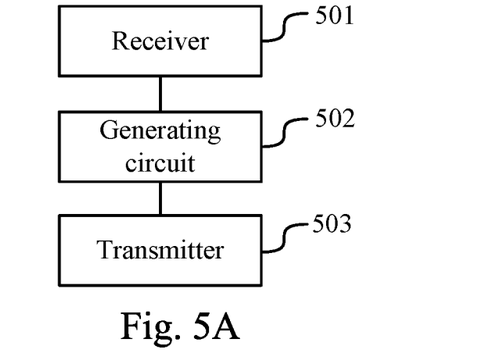
FIG. 5A is a block diagram of a device for state control of a user equipment, in accordance with an aspect of the disclosure.

FIG. 5A is a block diagram illustrating a device for state control of a user equipment in accordance with an aspect of the disclosure. With reference to FIG. 5A, the device includes a receiver 501, a generating circuit 502 and a transmitter 503.

The receiver 501, connected to the generating circuit 502, is configured to receive a state indication message that is sent by a user equipment (UE) upon detecting that the preset state switching event is triggered. The generating circuit 502, connected to the transmitter 503, is configured to generate, a state switching instruction for instructing the UE to switch to the connection state, based on the state indication message. The transmitter 503 is configured to send the state switching instruction to the UE.

In one possible implementation, the generating circuit 502 is configured to determine whether to allow the UE to switch to the connection state, based on the switching reason information; and generate the state switching instruction, if the UE is allowed to switch to the connection state.

In one possible implementation, the transmitter 503 is further configured to:

send a first paging message to the UE, when a bearer corresponding to traffic data to be sent by a base station does not belong to a designated bearer that is a bearer capable of transmitting traffic data in an inactive state, wherein the first paging message carries state switching information for indicating that the bearer corresponding to the traffic data does not belong to the designated bearer; or send a second paging message to the UE, when the bearer corresponding to the traffic data to be sent by the base station does not belong to the designated bearer, wherein the second paging message carries a traffic type of the traffic data.

Figure 5B:
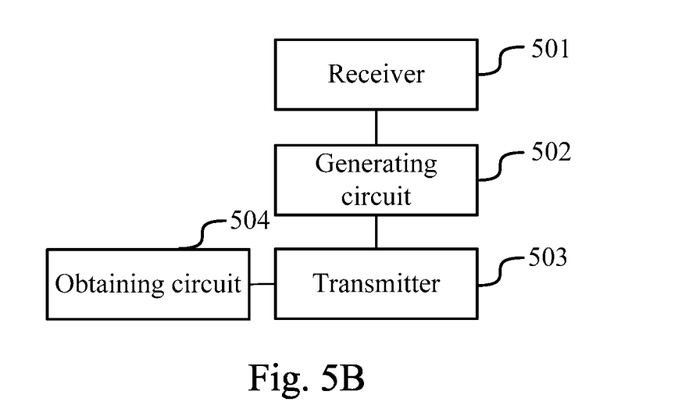
FIG. 5B is a block diagram of a device for state control of a user equipment, in accordance with an aspect of the disclosure.

In one possible implementation, with reference to FIG. 5B, the device further includes:

an obtaining circuit 504, configured to obtain configuration information of the designated bearer that is a bearer capable of transmitting traffic data in an inactive state, wherein the configuration information of the designated bearer is used to indicate a traffic type of the traffic data corresponding to the designated bearer.

The transmitter is further configured to send, an inactive state instruction carrying the configuration information of the designated bearer, to the UE.

In the device provided by the embodiments of the present disclosure, when the UE is in an inactive state, the base station can generate a state switching instruction for instructing the UE to switch from the inactive state to the connection state, based on the state indication message sent by the UE upon detecting that the preset state switching event is triggered. Moreover, the preset state switching event can fully cover situations in which the UE needs to switch to the connection state for data reception, so that the UE can ascertain when it needs to switch to the connection state, thereby ensuring normal transmission of various types of traffic data.

With respect to the device in the above embodiments, the specific manner in which each module performs the operations has been described in detail in the embodiments related to the methods, which will not be described in detail here.

Figure 6:
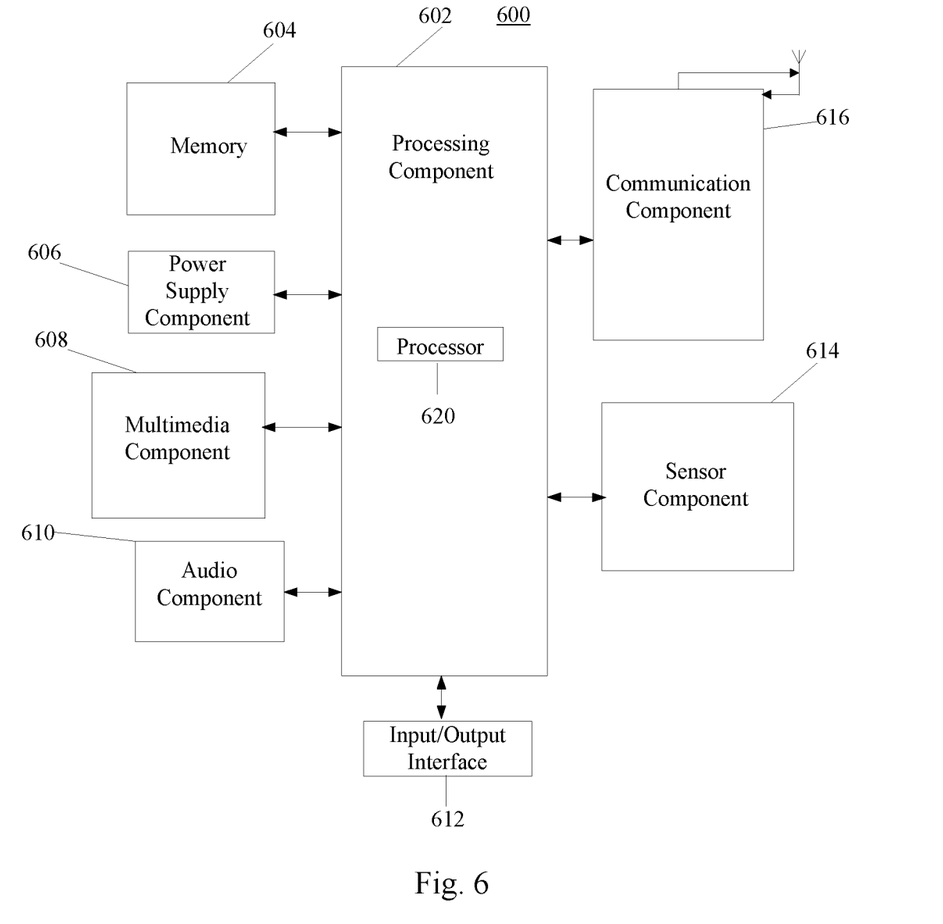
FIG. 6 is a structural schematic diagram of a user equipment, in accordance with an aspect of the disclosure.

FIG. 6 is a structural schematic diagram illustrating a user equipment in accordance with an aspect of the disclosure. For example, the user equipment 600 may be a mobile phone, a computer, a digital broadcast terminal, a messaging device, a game console, a tablet device, a medical device, a fitness device, a personal digital assistant, and the like.

Referring to FIG. 6, the user equipment 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls the overall operations of the user equipment 600, such as operations associated with display, phone calls, data communication, camera operations, and recording operations. The processing component 602 may include one or more processors 620 to execute instructions to complete all or part of the steps described above. In addition, the processing component 602 may include one or more modules to facilitate interaction between the processing component 602 and other components. For example, the processing component 602 may include a multimedia module to facilitate interaction between the multimedia component 608 and the processing component 602.

The memory 604 is configured to store various types of data to support the operations of the user equipment 600. Examples of such data include instructions for any application or method that operates on the user equipment 600, contact data, phonebook data, messages, pictures, videos, or the like. The memory 604 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 606 provides power to the various components of the user equipment 600. The power supply component 606 may include a power management system, one or more power supplies, and other components associated with generating, managing, and distributing power for the user equipment 600.

The multimedia component 608 includes a screen that provides an output interface between the user equipment 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panels. The touch sensor may sense not only the boundary of the touch or swipe action but also sense a duration and pressure associated with the touch or swipe operation. In some embodiments, the multimedia component 608 includes a front camera and/or a rear camera. The front camera and/or rear camera may receive external multimedia data when the user equipment 600 is in an operating mode, such as a photographing mode or a video mode. Each of front camera and rear camera may be a fixed optical lens system or have focus and optical zoom capability.

The audio component 610 is configured to output and/or input an audio signal. For example, the audio component 610 includes a microphone (MIC) that is configured to receive an external audio signal when the user equipment 600 is in an operating mode, such as a call mode, a recording mode, and a voice recognition mode. The received audio signal may be further stored in the memory 604 or transmitted via the communication component 616. In some embodiments, the audio component 610 also includes a speaker for outputting the audio signal.

The I/O interface 612 provides an interface between the processing component 602 and the peripheral interface module, which may be a keyboard, a click wheel, a button, or the like. These buttons may include, but are not limited to, a home button, a volume button, a start button, and a lock button.

The sensor component 614 includes one or more sensors for providing state assessments of various aspects of the user equipment 600. For example, the sensor component 614 may detect an open/closed state of the user equipment 600, relative positioning of the components, such as a display and a keypad of the user equipment 600. The sensor component 614 may also detect a change in position of the user equipment 600 or a component of the user equipment 600, presence or absence of user contact with the user equipment 600, an orientation or acceleration/deceleration of the user equipment 600, and a change in temperature of the user equipment 600. The sensor component 614 may include a proximity sensor configured to detect the presence of a nearby object without any physical contact. The sensor component 614 may also include a light sensor, such as a CMOS or CCD image sensor, for use in the imaging applications. In some embodiments, the sensor component 614 may also include an acceleration sensor, a gyroscope sensor, a magnetic sensor, a pressure sensor, or a temperature sensor.

The communication component 616 is configured to facilitate wired or wireless communication between the user equipment 600 and other devices. The user equipment 600 may access a wireless network based on a communication standard, such as WiFi, 2G or 3G or a combination thereof. In an aspect of the disclosure, the communication component 616 receives a broadcast signal or broadcast-related information from an external broadcast management system via a broadcast channel. In an exemplary embodiment, the communication component 616 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the user equipment 600 may be implemented by one or more application specific integrated circuits (ASICs), digital signal processors (DSPs), digital signal processing devices (DSPDs), programmable logic devices (PLDs), programming gate arrays (FPGAs), controllers, microcontrollers, microprocessors, or other electronic components, for performing the method for state control of the user equipment described above.

In an exemplary embodiment, there is also provided a non-transitory computer readable storage medium comprising instructions, such as memory 604 that includes instructions, which may be executed by the processor 620 of the user equipment 600 to implement the method described above. For example, the non-transitory computer readable storage medium may be a ROM, a random access memory (RAM), a CD-ROM, a magnetic tape, a floppy disk, an optical data storage device and the like.

In an exemplary embodiment, there is also provided a non-transitory computer readable storage medium that enables, when the instructions in the storage medium are executed by a processor of a user equipment, the user equipment to perform the method for state control of the user equipment.

Figure 7:
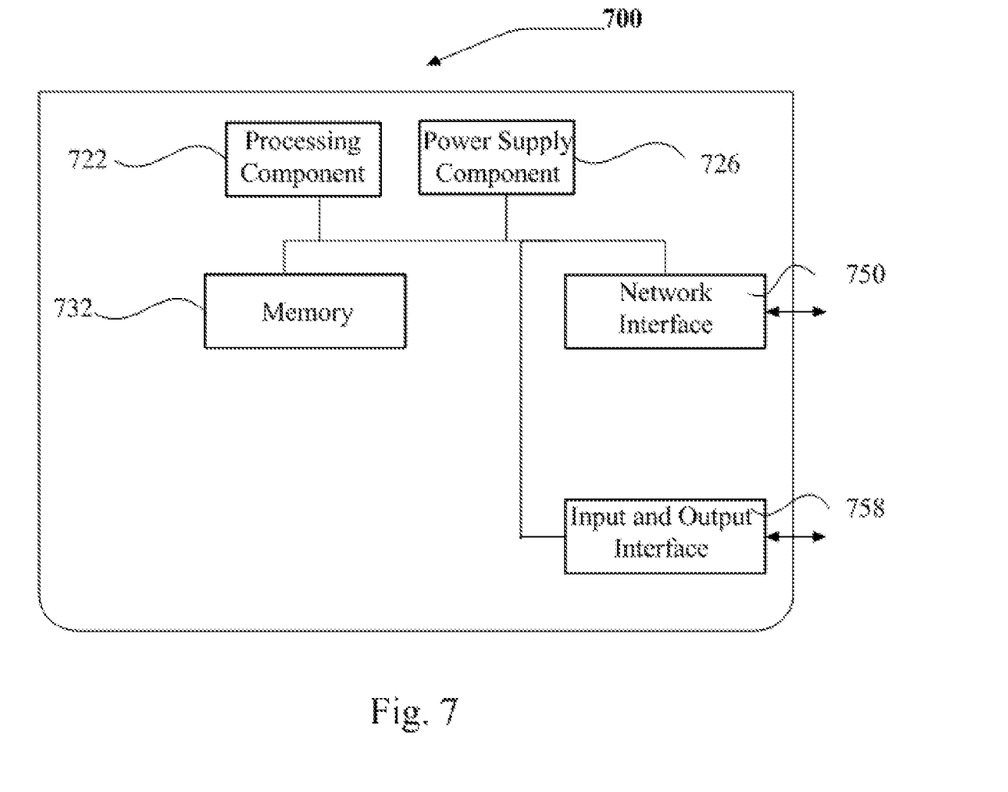
FIG. 7 is a structural schematic diagram of a base station in accordance with an aspect of the disclosure.

FIG. 7 is a structural schematic diagram of a base station in accordance with an aspect of the disclosure. Referring to FIG. 7, the base station 700 includes a processing component 722 that further includes one or more processors and a memory resource represented by the memory 732 for storing instructions executable by the processing component 722, such as application programs. The application programs stored in the memory 732 may include one or more modules each corresponding to a set of instructions. In addition, the processing component 722 is configured to execute instructions to perform the method performed by the base station in the embodiment of the method for state control of the user equipment described above.

The base station 700 may also include a power supply component 726 configured to perform power management of the base station 700, one or more wired or wireless network interfaces 750 configured to connect the base station 700 to the network, and an input and output (I/O). The base station 700 may operate based on an operating system stored in the memory 732, for example Windows Server™, Mac OS X™, Unix™, Linux™, FreeBSD™, or the like.

Other embodiments of the present disclosure will be readily apparent to those skilled in the art upon consideration of the specification and practice of the invention disclosed herein. The present application is intended to cover any variations, uses, or adaptations of the present disclosure that follow the general principles of the present disclosure and include the common knowledge or conventional technical means in the art, which are not disclosed in the present disclosure. The specification and examples are to be regarded as illustrative only, and the true scope and spirit of the disclosure is indicated by the following claims.

It is to be understood that this disclosure is not limited to the exact constructions described above and illustrated in the accompanying drawings, and that various modifications and changes may be made without departing from the scope thereof. The scope of the present disclosure is limited only by the appended claims.

What is claimed is:

1. A method for controlling states of a user equipment (UE), applied to the UE, the method comprising:
    detecting whether a preset state switching event is triggered, wherein the UE is in an inactive state;
    sending, a state indication message for indicating that the UE needs to switch to a connection state, to a base station, upon detecting that the preset state switching event is triggered, wherein a state switching instruction for instructing the UE to switch to the connection state is returned by the base station according to the state indication message;
    switching from the inactive state to the connection state according to the state switching instruction;
    wherein the preset state switching event comprises at least one of the followings:
    a bearer corresponding to traffic data to be sent by the UE does not belong to a designated bearer that is a bearer capable of transmitting traffic data in the inactive state; and
    a bearer corresponding to traffic data to be received by the UE does not belong to the designated bearer;
    wherein prior to the detecting whether the preset state switching event is triggered, the method further comprises:
    receiving an inactive state instruction of the base station, wherein the inactive state instruction comprises configuration information of the designated bearer for indicating a traffic type of traffic data corresponding to the designated bearer;
    entering the inactive state according to the inactive state instruction, and storing the configuration information of the designated bearer; and
    performing the step of detecting whether the preset state switching event is triggered according to the configuration information of the designated bearer.

2. The method of claim 1, wherein the preset state switching event comprises that the bearer corresponding to the traffic data to be received by the UE does not belong to the designated bearer, and wherein detecting that whether the preset state switching event is triggered comprises:
    upon reception of a first paging message sent by the base station, determining that the preset state switching event is triggered, wherein the first paging message carries state switching information for indicating that the bearer corresponding to the traffic data to be received by the UE does not belong to the designated bearer; and
    upon reception of a second paging message sent by the base station, determining whether the bearer corresponding to the traffic data to be received belongs to the designated bearer, according to a traffic type of the traffic data carried in the second paging message; upon determination that the bearer corresponding to the traffic data to be received does not belong to the designated bearer, determining that the preset state switching event is triggered.

3. The method of claim 1, wherein sending the state indication message to the base station comprises:
    generating switching reason information according to the triggered preset state switching event; and
    sending the switching reason information carried in the state indication message to the base station, wherein the state switching instruction is returned by the base station according to the switching reason information.

4. A user equipment (UE), comprising:
    a processor;
    a non-transitory storage configured to store processor executable instructions; wherein the instructions cause the processor to:
    detect whether a preset state switching event is triggered, wherein the UE is in an inactive state; send, a state indication message for indicating that the UE needs to switch to the connection state, to a base station, upon detecting that the preset state switching event is triggered, wherein a state switching instruction for instructing the UE to switch to the connection state is returned by the base station according to the state indication message; switch from the inactive state to the connection state according to the state switching instruction;

wherein the preset state switching event comprises at least one of the followings:

a bearer corresponding to traffic data to be sent by the UE does not belong to a designated bearer that is a bearer capable of transmitting traffic data in the inactive state; and a bearer corresponding to traffic data to be received by the UE does not belong to the designated bearer;

wherein the processor is further configured to: prior to detecting whether the preset state switching event is triggered, receive an inactive state instruction of the base station, wherein the inactive state instruction comprises configuration information of the designated bearer for indicating a traffic type of traffic data corresponding to the designated bearer;

enter the inactive state according to the inactive state instruction, and storing the configuration information of the designated bearer; and perform the step of detecting whether the preset state switching event is triggered according to the configuration information of the designated bearer.

5. The user equipment of claim 4, wherein the preset state switching event comprises that the bearer corresponding to the traffic data to be received by the UE does not belong to the designated bearer, and wherein the processor is further configured to:

upon reception of a first paging message sent by the base station, determine that the preset state switching event is triggered, wherein the first paging message carries state switching information for indicating that the bearer corresponding to the traffic data to be received by the UE does not belong to the designated bearer; and upon reception of a second paging message sent by the base station, determine whether the bearer corresponding to the traffic data to be received belongs to the designated bearer, according to a traffic type of the traffic data carried in the second paging message; upon determination that the bearer corresponding to the traffic data to be received does not belong to the designated bearer, determine that the preset state switching event is triggered.

6. The user equipment of claim 4, wherein the processor is further configured to:

generate switching reason information according to the triggered preset state switching event; and send the switching reason information carried in the state indication message to the base station, wherein the state switching instruction is returned by the base station according to the switching reason information.

* * * * *